3,058,921
EPOXY ETHERS, THEIR PREPARATION AND CURE

Calvin E. Pannell, Walnut Creek, Calif., assignor to Shell Oil Company, New York, N.Y., a corporation of Delaware
No Drawing. Filed Mar. 17, 1958, Ser. No. 721,698
15 Claims. (Cl. 260—2)

This invention relates to a new class of epoxy materials and to their preparation and cure. More particularly, the invention relates to new epoxy ethers prepared from polymers of halo-epoxy-substituted alkanes and to the utilization of the new epoxy ethers, particularly in the preparation of surface coatings and in the preparation of pottings and castings.

Specifically, the invention provides new and particularly useful epoxy ethers, and preferably polyglycidyl polyethers, obtained by treating a halo-epoxy-substituted alkane, such as epichlorohydrin, with a condensation catalyst in the presence of a controlled amount of water and then treating the resulting polymer with an alkaline material. The invention further provides cured insoluble, infusible products obtained by reacting the new polyepoxy materials with epoxy curing agents alone or in admixture with other epoxy compounds.

As a special embodiment, the invention provides glycidyl ethers of the formula

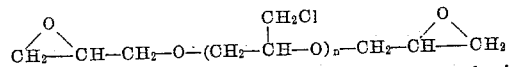

wherein $n$ is an integer from 4 to 20, which are obtained by treating epichlorohydrin with an acidic condensation catalyst in the presence of controlled amounts of water and then treating the resulting polymer with alkaline material. Insoluble, infusible products obtained by curing these special glycidyl ethers are also claimed.

It is an object of the invention to provide a new class of polyepoxy materials. It is a further object to provide new polyepoxy polyethers prepared from polymers of halo-epoxy-substituted alkanes and to a method for their preparation. It is a further object to provide new polyepoxy materials that are particularly useful in the preparation of surface coating compositions. It is a further object to provide new liquid polyepoxy materials that have low viscosities and are suitable for making solventless varnishes. It is a further object to provide new polyepoxy materials that form coatings having improved flexibility and improved resistance to water. It is a further object to provide new epoxy ethers that give coatings having good resistance to embrittlement on ageing. It is a further object to provide new polyepoxy materials that have improved compatibility characteristics, particularly with low cost resins. It is a further object to provide resinous plasticizer-stabilizers for halogen-containing polymers. Other objects and advantages of the invention will be apparent from the following detailed description thereof.

It has now been discovered that these and other objects may be accomplished by the new products of the invention comprising epoxy ethers, and preferably polyglycidyl polyethers, obtained by treating a halo-epoxy-substituted alkane, such as epichlorohydrin, with an acidic condensation catalyst in the presence of a controlled amount of water and then treating the resulting polymer with an alkaline material. It has been found that these special polyepoxy materials have surprising properties which make them useful in many applications. It has been found, for example, that the liquid polyepoxy materials prepared by the above method have surprisingly low viscosities and can be utilized alone or in admixture with other polyepoxy materials to form solventless varnishes.

In addition, it has been found that these polyepoxy materials can be easily cured to form insoluble, infusible products having many attractive properties. The cured products possess, for example, surprising resistance to embrittlement on ageing. This was unexpected in view of the high halogen content of the polyepoxy material. In addition, the cured products having excellent flexibility and improved resistance to water. This was also unexpected in view of the large amount of chlorine in the resinous polymers.

The expression "halo-epoxy-substituted alkane" as used herein refers to those alkanes having a vic-epoxy group, i.e., a

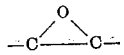

group, attached directly to a halogen bearing carbon atom, such as, for example, epichlorohydrin, epibromohydrin, 1,4-dichloro-2,3-epoxybutane, 1-chloro-2,3-epoxypentane and the like. Especially preferred are the halo-epoxy-substituted alkanes containing no more than 12 carbon atoms, and preferably from 3 to 8 carbon atoms.

According to the process of the invention, the above-described halo-epoxy-substituted alkanes are first treated with a condensation catalyst in the presence of a controlled amount of water to form a hydrohydrin polymer. The condensation catalysts used in the polymerization reaction include, among others, the acidic materials, such as hydrofluoric, sulfuric, phosphoric, and hydroiodic acids, salts, such as tin tetrachloride and boron trifluoride complexes, especially the ether complex. The concentration of the catalyst employed will vary, depending upon the catalyst and the mol wt. of polymer desired. In general, the catalyst will be employed in amounts varying from about .1% to about 5% by weight of the reactants. Larger amounts of catalysts, such as $BF_3$-complex, may be needed to obtain the higher molecular weight polymers are noted hereinafter.

As noted, the polymeriaztion is conducted in the presence of water. As to the ratio of halo-epoxy-substituted alkane and water employed in the reaction, there should be at least four moles of the halo-epoxy-substituted alkane and preferably from 4 to 30 moles of the halo-epoxy-substituted alkane per mol of water. The exact ratio selected will depend on the molecular weight of the polymer desired, the higher ratios giving the higher molecular weights. Polymers having particularly outstanding properties in the formation of coatings are those wherein the halo-epoxy-alkane and the water are employed in ratios varying from 4:1 to 20:1.

In mixing the components together, the halo-epoxy-substituted alkane and water and catalyst may be combined all at the beginning or one or more of the components may be added separately at one time or throughout the course of the reaction. Best results are generally obtained when the halo-epoxy-substituted alkanes are added in portions throughout the course of the reaction.

To obtain the higher molecular weight polymers, such as those resulting from the use of ratios of 10:1 or higher, it is highly desirable to also add portions of catalyst in the latter part of the reaction. This is due to the fact that after a certain amount of polymer formation, the catalyst generally disappears and further addition of catalyst should be employed in order to continue to build up the molecular weight. The amount added in the second stage should be approximately the same as that added at the beginning, e.g., .1% to 5% by weight.

The temperatures used in the polymerization will vary over a wide range. In general, the temperature employed will vary from about 30° C. to 150° C., and more preferably, from 50° C. to 100° C. Higher temperatures will, of course, give faster reaction rates and are generally desirable.

The heating is continued until substantially all of the halo-epoxy-substituted alkane has polymerized. In general, this will require from about 1 to 25 hours, depending on catalyst and temperature.

The polymers formed by the above method will comprise halo-substituted polyhydroxy-substituted alkanes, which in the case of epichlorohydrin will have the following structure.

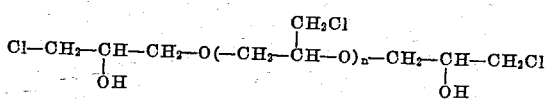

wherein $n$ is an integer of at least 2 and preferably 2 to 25. The polymers will vary from fluid liquids to thick semi-solids, depending upon the number assigned to $n$ in the above formula.

The polymers prepared as described above are treated with an alkaline material to produce the desired epoxy ethers. This reaction may be accomplished by adding the alkaline material directly to the reaction mixture used in preparing the polymers or the polymer may be recovered before it is combined with the alkaline material.

Any of the known dehydrohalogenation materials may be used in this reaction, such as sodium and potassium hydroxide, sodium and potassium carbonates and bicarbonates, hydroxides or magnesium, zinc, lead, iron and aluminum, and the corresponding oxides, etc. The aluminates, silicates and zincates of alkali salts, such as sodium and potassium aluminate and sodium and potassium zincate, are particularly good dehydrohalogenating agents when used in substantially, or completely, non-aqueous media.

The amount of the dehydrohalogenating agent used may vary over a considerable range. If all of the

groups are to be converted to epoxy groups, the halohydrin should be reacted with an amount of the alkaline material which is at least equivalent to the hydrogen halide content of that halohydrin. Thus, if all of the halohydrin groups on the polymer noted above are to be converted to epoxy groups, the above product should be reacted with approximately 2 moles of the alkaline material. Less than the equivalent amount of the alkaline material may be used if all of the halohydrin groups are not to be converted to the epoxy groups.

In most cases, the alkaline material may be applied to the halohydrin as an aqueous solution or suspension or dissolved in an inert solvent, such as ethers, aliphatic, cycloaliphatic and aromatic hydrocarbons, halogenated hydrocarbons, and the like. If the above-noted aluminates, silicates or zincates are used as the alkaline material, the dehydrohalogenation is preferably effected in a non-aqueous medium and the salts by themselves or dissolved in organic solvents or diluents. Carbon tetrachloride, 1,4-dioxane and dichloroethyl ether are particularly satisfactory as solvents for this purpose.

In most cases, the dehydrohalogenation reaction may be accomplished at temperatures which preferably range from about 20° C. to 150° C. and still more preferably 25° C. to 80° C.

At the end of the reaction period, the reaction mixture may be filtered through a suitable filtering medium, e.g., diatomaceous earth, to remove any alkali metal halide and any excess catalyst. The filtrate may then be treated to recover the epoxide. If the reaction has been conducted in the presence of water, care should be taken to avoid hydrolysis of the epoxide groups during the separation process. This can be accomplished by various extraction or distillation methods using subatmospheric pressures and conditions unfavorable to hydrolysis of the epoxide groups. Separation may be conveniently effected by treating the aqueous reactant mixture in a continuous extraction apparatus wherein any suitable extractant such as ester, alcohol, ether, hydrocarbon, etc., may be utilized. The extracted epoxide may be separated from its solution with the extractant by subjecting the preferably anhydrous solution to distillation or fractionation operation.

In the case where the reaction has been conducted in the absence of water, but in the presence of solvents, as is preferably the case with the above-described aluminates, silicates and zincates, the novel polyepoxy polyethers may be recovered by any suitable method, such as distillation, extraction, and the like. If no solvent or diluent is employed, the polyether polyepoxide may be recovered and purified by any convenient method, such as distillation under the reduced pressure, extraction, fractional precipitation, and the like.

The epoxy ethers of the invention will be fluid or viscous liquids to semi-solids having at least one epoxy group and preferably more than one epoxy group per molecule and possessing a high percent, and preferably at least 25% and preferably above 30% by weight of halogen, such as chlorine. The epoxy ethers are soluble in most solvents, such as ketone alcohols and liquid hydrocarbons, and are compatible with many synthetic oils and resins.

For certain applications, such as in the preparation of surface coatings, fibers or filaments, it is sometimes desirable to have products of still higher molecular weights. Such products may be obtained by reacting the above described polyepoxy ethers with polyhydric compounds, such as polyhydric phenols.

Polyhydric compounds used for this purpose may be any polyhydric alcohol or polyhydric phenols. Polyhydric phenols that may be used for this purpose include, among others, resorcinol, catechol, hydroquinone, methyl resorcinol, polynuclear phenols, such as 2,2-bis(4-hydroxyphenyl)propane.

In case the polyhydric material employed in the above reaction is a polyhydric phenol, the reaction may generally be accomplished by merely heating the new polyether polyepoxides with the phenol. In the case of the other polyhydric materials, such as polyhydric alcohols, the reaction is usually quite slow and it is advisable to employ a catalyst, such as the above-described catalysts employed for the polymerization reaction. The reaction may be conducted in the presence or absence of solvents or diluents and may be conducted at temperatures generally ranging from about 25° C. to 150° C. In the case of the polyhydric phenols, preferred temperatures range from about 50° C. to 80° C. With the other polyhydric materials, preferred temperatures range from about 40° C. to 120° C.

If the resulting higher molecular weight products possess less than the desired number of epoxy groups, such as may be the case when the dihydric material is reacted with less than a double molar quantity of the new polyether polyepoxide, additional epoxy groups may be introduced by reacting the higher molecular weight product with additional quantities of the epoxy-forming material, e.g., quantities such as would furnish one epoxy group of each of the OH groups of the polyhydric material to be reacted. Thus, if the higher molecular weight product was obtained by reacting one mole of the new polyether polyepoxide with two moles of a dihydric phenol, the resulting higher molecular weight product would then be reacted with approximately two moles of the epoxy-forming material. The halohydrin obtained would then be dehydrohalogenated according to the above-described procedure used for preparing the new polyether polyepoxides. The higher molecular weight products produced by the above method vary from viscous liquids to solids having relatively high melting points. They possess active epoxy groups as well as hydroxyl groups and may be cured or undergo further reaction through either of these functional groups.

The new polyepoxy materials and their higher molecular weight derivatives produced as shown in the preceding paragraphs may be polymerized through the epoxy group to form valuable polymeric products. They may be polymerized alone or with other polyepoxide materials in a variety of different proportions, such as, for example, with amounts of other polyepoxides varying from 5% to 95% by weight. Polyepoxides that may be co-polymerized with these new polyepoxides include, among others, glycidyl polyethers of polyhydric phenols obtained by reacting polyhydric phenols, such as bis-phenol, resorcinol, and the like, with an excess of chlorohydrin, such as epichlorohydrin, polyepoxide polyethers obtained by reacting an alkane polyol, such as glycerol and sorbitol, with epichlorohydrin and dehydrohalogenating the resulting product, polymers prepared from ethylenically unsaturated epoxides, such as allyl glycidyl ether, alone or with other ethylenically unsaturated monomers, and polyepoxide polyethers obtained by reacting a polyhydric alcohol or polyhydric phenol with any of the above-described polyepoxides. The glycidyl polyethers of polyhydric phenols obtained by condensing the polyethers of polyhydric phenols with epichlorohydrin as described above are also referred to as "ethoxyline" resins. See Chemical Week, vol. 69, page 27, for September 8, 1951.

A great variety of different curing agents may be employed in effecting the above-described homo- and co-polymerization. Such agents include, among others, carboxylic acids or anhydrides, such as oxalic acid, phthalic anhydride; Friedel-Crafts metal halides, such as aluminum chloride, zinc chloride, ferric chloride or boron trifluoride as well as complexes thereof with ethers, acid anhydrides, ketones, diazonium salts, etc.; phosphoric acid and partial esters thereof including n-butyl orthophosphate, diethyl orthophosphate and hexaethyl tetraphosphate; amino compounds, such as triethylamine, ethylene diamine, diethylamine, diethylene triamine, triethylene tetramine, dicyandiamide, melamine; and salts of inorganic acids, such as zinc fluoborate, potassium persulfate, nickel fluoborate, copper fluoborate, selenium fluoborate, magnesium fluoborate, tin fluoborate, potassium perchlorate, cupric sulfate, cupric phosphate, cupric phosphite, magnesium arsenate, magnesium sulfate, cadmium arsenate, cadmium silicate, aluminum fluoborate, ferrous sulfate, ferrous silicate, manganese hypophosphite, nickel phosphate and nickel chloride.

The amount of the curing agents employed may vary over a considerable range depending upon the agent selected. With curing agents having replaceable hydrogen, such as the amine agents, amounts of agent employed vary up to and including equivalent proportions, i.e., sufficient curing agent to furnish a replaceable hydrogen atom for every epoxy group to be reacted. In most cases, satisfactory cures are obtained with amounts varying from 1% to 25% by weight of the material being polymerized. With the phosphoric acid and esters, particularly preferred amounts vary from about 3% to 20% by weight. The other curing agents are preferably employed in amounts varying from 1% to 20%.

The higher molecular weight hydroxy-containing ethers may also be cured through the hydroxy group by the addition of appropriate amounts, e.g., 1% to 25% by weight of polybasic acids or anhydrides, polyisocyanates, and the like.

The curing is preferably effected by mixing the curing agent with the polyepoxide and heating the mixture together, preferably at temperatures ranging from about 40° C. to 200° C. Solvent or diluents may be employed in the polymerization depending upon the intended application of the polymer and ease of operation of the polymerization reaction.

If the polyether polyepoxides and their higher molecular weight derivatives are to be used in the preparation of castings or pottings, the curing agent and the epoxy material are generally combined together and then poured into the desired mold or casting containing the electrical wires or apparatus and the mixture heated to effect the cure.

The polyether polyepoxides and their higher molecular weight derivatives may also be employed with the afore-described curing agents to prepare improved surface coating compositions of the air-drying or baking type. In utilizing the products for this application, it is generally desirable to combine the epoxy material and curing agent with the desired solvents, and if desired, other film-forming materials and driers, and then apply the resulting mixture to the surface to be coated. Film-forming materials that can be used with the epoxy material in this manner include the drying oils, such as tung oil, linseed oil, dehydrated castor oil, soyabean oil, and the like; cellulose derivatives such as cellulose nitrate, cellulose acetate, cellulose acetate butyrate, cellulose propionate, ethyl cellulose, and mixtures thereof; and vinyl polymers, such as polymers of vinyl chloride, vinylidine chloride, methyl methacrylate, diallyl phthalate, and the like. The coatings prepared in this maner may be allowed to set to a hard finish at room temperature or heat may be applied to hasten the cure.

The new liquid polyether polyepoxides are particularly suited for use in preparing coating compositions as described above, as they may be combined with conventional liquid grade glycidyl ethers of polyhydric phenols (e.g., Epon resins) and used without solvents to form solventless varnishes which cure to form hard, solvent resistant films.

The new polyether polyepoxides may also be employed with the curing agents to prepare valuable adhesive compositions. In utilizing the products for these applications, it is generally desirable to combine the liquid epoxy material alone or with other epoxy resins with conventional fillers and curing agents and then using the spreadable fluid as adhesive for materials, such as wood, plastic, metal and the like.

In addition, the new epoxy ethers may be used as stabilizing agents for various halogen-containing polymers, and particularly the vinyl halide polymers. These products may be used as stabilizers, along or in combination with other stabilizing agents, such as urea and thiourea derivatives. In most cases, the products are effective as stabilizers in amounts varying from about 1% to 5% by weight of the polymer being stabilized. The epoxy materials may be combined with the halogen-containing polymer by any suitable method, such as by dissolving the products in a suitable solvent or by milling the products together on a suitable roll mill.

They may also be used as secondary plasticizers in combination with plasticizers, such as dioctyl phthalate, and the like.

To illustrate the manner in which the invention may be carried out, the following examples are given. It is to be understood that the examples are for the purpose of illustration and the invention is not be regarded as limited to any of the specific compounds or conditions recited therein. Unless otherwise specified, parts disclosed in the examples are parts by weight.

*Example 1*

This example illustrates the preparation and some of the properties of a polymeric diglycidyl ether of

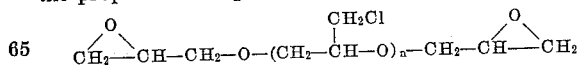

wherein $n$ is 10.

1.5 parts of $BF_3$-ethyl etherate was added to 18 parts of water and the mixture heated to 70° C. 1000 parts of epichlorohydrin was then slowly added to the water. When all the epichlorohydrin had been added, 1.25 parts more of the catalyst was added and 850 parts more of epichlorohydrin added. The addition of the epichlorohydrin took a total of about 5 hours. The reactants were thus combined in a ratio of 20 epi to 1 water.

300 parts of ether was then added to the mixture and 134 parts of powdered sodium hydroxide added. After 1¼ hours, the mixture was filtered and the ether flashed off. The resulting product was a glycidyl ether as noted above. It was a viscous amber liquid having a viscosity of 54.5 poises. Analysis indicated product contained 33.8% chlorine, 0.183 eq./100 g. epoxy and a chlorohydrin value of 0.02. The polymer had a molecular weight of 937.

50 parts of the above glycidyl ether was mixed with 50 parts of diglycidyl ether of 2,2-bis(4-hydroxyphenyl)-propane having an epoxy value of 0.52 eq./100 g. 8 parts of diethylene triamine per 100 parts of the mixture was then added. The mixture was fluid liquid. The mixture was spread out on tin plates and baked for 1 hour at 120° C. The resulting films were very hard and had good flexibility and resistance to solvents and water and good resistance to embrittlement on ageing.

Related results were obtained by varying the ratio of the above-noted glycidyl ether and the diglycidyl ether of 2,2-bis(4-hydroxyphenyl)propane from 1:1 to 10:1.

*Example II*

This example illustrates the preparation of a polymeric diglycidyl ether of the formula in Example I wherein $n$ is 6.

.5 part of $BF_3$-ethyl etherate was added to 9 parts of water and the mixture heated to 70° C. 412 parts of epichlorohydrin was then slowly added to the water. The mixture was then kept at 60-70° C. for several hours.

500 parts of ether was then added to the mixture and 61.6 parts of potassium hydroxide added. After 1¼ hours, the mixture was filtered and the ether flashed off. The resulting product was a glycidyl ether as noted above. It was a fluid liquid having a viscosity of 12.4 poises at room temperature. Analysis indicated the product had a chlorine content of 31.9%, chlorohydrin value of 0.099, molecular weight of 570 and epoxy value of 0.23.

50 parts of the above glycidyl ether was mixed with 50 parts of a diglycidyl ether of 2,2-bis(4-hydroxyphenyl) propane having an epoxy value of 0.52 eq./100 g. The mixture was a fluid liquid which could be easily spread out as a film. The mixture was spread out on tin plates and baked for 1 hour at 120° C. The resulting films were very hard and had good flexibility and resistance to solvents, water and did not embrittle on ageing.

*Example III*

This example illustrates the preparation of a polymeric diglycidyl ether having the formula noted in Example I wherein $n$ is 4.

.5 part of $BF_3$-ethyl etherate was added to 18 parts of water and the mixture heated to 70° C. 520 parts of epichlorohydrin was then slowly added to the water. The mixture was then kept at 60-70° for several hours.

200 parts of ether was then added to the mixture and 56 parts of powdered KOH added. After 1¼ hours, the mixture was filtered and the ether flashed off. The resulting product was a glycidyl ether having the structure as noted above. The product had a viscosity of 4 poises at room temperature. Analysis indicated the product had a chlorine value of 28.7, a molecular weight of 478, an epoxy value of 0.381 eq./100 g. and OH value of 0.08.

50 parts of the above glycidyl ether was mixed with 50 parts of the diglycidyl ether of 2,2-bis(4-hydroxyphenyl) propane as in the preceding example. 8 parts of diethylene triamine was then added. The mixture was a fluid mixture which could be easily spread as a film. Films spread out on tin plates were cured at 120° C. for 1 hour. These films were very hard and had good flexibility and good resistance to solvents, water, and did not embrittle on ageing.

*Example IV*

This example illustrates the preparation of a polymeric diglycidyl ether of the formula as in Example I wherein $n$ is 13.

4 parts of $BF_3$-ethyl etherate was added to 18 parts of water and the mixture heated to 70° C. 1000 parts of epichlorohydrin was then slowly added to the water. When all the epichlorohydrin had been added, 1.25 parts more of catalyst was added and 390 more parts of epichlorohydrin added. The addition of the epichlorohydrin took a total of about 5 hours.

300 parts of ether was then added to the mixture and 88 parts of powdered KOH was added. After 1¼ hours, the mixture was filtered and the ether flashed off. The resulting product was a glycidyl ether having a structure as noted above. The product had a viscosity of 162 poises at room temperature. Chlorine value of 34.0%, epoxy value of 0.117 eq./100 g. and chlorohydrin value of 0.033.

A mixture of 50 parts of the above glycidyl ether and the diglycidyl ether of 2,2-bis(4-hydroxyphenyl)propane cured with 8 parts of diethylene triamine was a hard flexible casting having good water resistance.

*Example V*

This example illustrates the preparation of a polymeric diglycidyl ether having the formula noted in Example I wherein $n$ is 20.

3 parts of $BF_3$-ethyl etherate was added to 9 parts of water and the mixture heated to 70° C. 1000 parts of epichlorohydrin was then slowly added to the water. When all the epichlorohydrin had been added, 3 parts more of the $BF_3$-ethyl etherate and 600 parts more of epichlorohydrin was added. The addition of the epichlorohydrin took a total of about 6 hours.

300 parts of ether was then added to the mixture and 88 parts of powdered KOH aded. After 1¼ hours, the mixture was filtered and the ether flashed off. The resulting product was a glycidyl ether having the structure noted above. The product was a viscous liquid having a chlorine content of 34.7%, epoxy value of 0.105 eq./100 g., and a chlorohydrin value of 0.003.

50 parts of the above glycidyl ether was mixed with 50 parts of diglycidyl ether of 2,2-bis(4-hydroxyphenyl) propane having an epoxy value of 0.52 eq./100 g. 8 parts of diethylene triamine per 100 parts of the mixture was then added. The mixture was cured at 120° C. for one hour. The resulting product was a hard insoluble infusible casting having good flexibility and good resistance to water and good resistance to embrittlement on ageing.

Related results are obtained by varying the ratio of the above-noted glycidyl ether and the diglycidyl ether of 2,2-bis(4-hydroxyphenyl)propane from 1:1 to 10:1.

*Example VI*

Examples I to V are repeated with the exception that phosphoric acid is used as the catalyst instead of $BF_3$-ethyl etherate. Similar products are obtained.

*Example VII*

2 mols of the diglycidyl ether prepared in Example I was combined with 1 mol of 2,2-bis(4-hydroxyphenyl) propane and the mixture heated. The resulting viscous product could be cured with metaphenylene diamine to form an insoluble product.

I claim as my invention:

1. A liquid polymeric polyepoxy material of the formula $$CH_2\underset{O}{-}CH-CH_2-O-(CH_2-\underset{CH_2Cl}{CH}-O)_n-CH_2-CH\underset{O}{-}CH_2$$

wherein $n$ is an integer greater than 4.

2. A liquid polyepoxy material as in claim 1 wherein $n$ is greater than 4 but no greater than 8.

3. A liquid polyepoxy material as in claim 1 wherein $n$ is 8 to 15.

4. A liquid polyepoxy material as in claim 1 wherein $n$ is about 20.

5. A process for preparing liquid vic-epoxy ethers which comprises contacting a chloro-epoxy-substituted alkane containing up to 8 carbon atoms and having a vic-epoxy group attached to a chlorine-bearing carbon atom with an acidic condensation catalyst in the presence of water and then treating the resulting product with an alkaline material in sufficient amount to neutralize any acid present and in addition to furnish one mole of alkaline material per chlorohydrin group to be dehydrochlorinated, there being more than 6 moles of chloro-epoxy-substituted alkane per mol of water.

6. A process for preparing a liquid epoxy ether which comprises contacting a chloro-epoxy-substituted alkane containing up to 8 carbon atoms and having a vic-epoxy group attached to a chlorine-bearing carbon atom with an acidic condensation catalyst in the presence of water and then treating the resulting product with an alkaline material in sufficient amount to neutralize the acidic condensation catalyst and in addition to furnish at least two moles of the alkaline material per mole of the said resulting product, there being more than 6 but no more than 30 moles of chloro-epoxy-substituted alkane for every mol of water.

7. A process as in claim 6 wherein the reaction is accomplished at a temperature between 50° C. and 150° C.

8. A process as in claim 6 wherein the condensation catalyst is hydrofluoric acid.

9. A process as in claim 6 wherein the halo-epoxy-substituted alkane is epichlorohydrin.

10. A process as in claim 6 wherein the halo-epoxy-substituted alkane is employed in more than 6 but no more than 20 moles per mol of water.

11. A process as in claim 8 wherein the condensation catalyst is employed in an amount varying from .1% to 5% by weight of the halo-epoxy-substituted alkane.

12. A process for preparing liquid glycidyl polyether which comprises contacting epichlorohydrin with an acidic condensation catalyst in the presence of water and treating the resulting product with an alkaline material in sufficient amount to neutralize the acidic condensation catalyst and in addition to furnish at least two moles of the alkaline material per mole of the said resulting product, the amount of epichlorohydrin being more than 6 but no more than 20 moles per mol of water.

13. A process as in claim 12 wherein the alkaline material is sodium hydroxide.

14. A liquid polymeric polyepoxy material of the formula

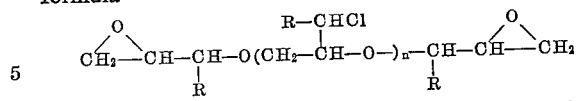

wherein R is a member of the group consisting of hydrogen and alkyl radicals and $n$ is an integer greater than 4 but no greater than 20, the unit

and each unit

containing no more than 8 carbon atoms each.

15. A liquid polymeric epoxy material of the formula

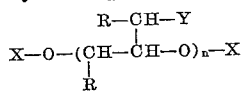

wherein one X is a vic-epoxyalkyl radical containing up to 8 carbon atoms and the other is selected from the group consisting of chlorohydroxy-substituted alkyl radicals containing up to 8 carbon atoms and vic-epoxyalkyl radicals containing up to 8 carbon atoms, Y is a chlorine atom, R is a member of the group consisting of hydrogen and alkyl radicals, and $n$ is an integer greater than 4.

References Cited in the file of this patent

UNITED STATES PATENTS

| | | |
|---|---|---|
| 2,070,990 | Groll et al. | Feb. 16, 1937 |
| 2,581,464 | Zech | Jan. 8, 1952 |
| 2,599,799 | Wittcoff | June 10, 1952 |
| 2,871,219 | Baggett et al. | Jan. 27, 1959 |
| 2,891,073 | Smith | June 16, 1959 |
| 2,902,398 | Schroeder | Sept. 1, 1959 |

FOREIGN PATENTS

| | | |
|---|---|---|
| 477,843 | Great Britain | Jan. 3, 1938 |

OTHER REFERENCES

Paterna et al.: J. Chem. Soc., vol. 66, 1894, Part 1, Abstracts, page 486. (Copy in Scientific Library.)